(12) United States Patent
Brando et al.

(10) Patent No.: US 8,443,448 B2
(45) Date of Patent: May 14, 2013

(54) SYSTEM AND METHOD FOR DETECTION OF NON-COMPLIANT SOFTWARE INSTALLATION

(75) Inventors: Danny Brando, Livingston, NJ (US); Joonho Lee, New York, NY (US); Jia Ye, Brooklyn, NY (US)

(73) Assignee: Federal Reserve Bank of New York, New York, NY (US)

( * ) Notice: Subject to any disclaimer, the term of this patent is extended or adjusted under 35 U.S.C. 154(b) by 743 days.

(21) Appl. No.: 12/544,652

(22) Filed: Aug. 20, 2009

(65) Prior Publication Data

US 2011/0047621 A1 Feb. 24, 2011

(51) Int. Cl.
*G06F 21/00* (2006.01)

(52) U.S. Cl.
USPC ............ 726/24; 713/150; 713/151; 713/152; 713/153; 713/154; 713/155; 713/156; 713/157; 713/158; 713/159; 713/160; 713/161; 713/162; 713/163; 713/164; 713/165; 713/166; 713/167; 713/168; 713/169; 713/170; 713/171; 713/172; 713/173; 713/174; 713/175; 713/176; 713/177; 713/178; 713/179; 713/180; 726/22; 726/23; 726/25; 726/26

(58) Field of Classification Search .............. 726/22–26; 713/150–180
See application file for complete search history.

(56) References Cited

U.S. PATENT DOCUMENTS

| | | | |
|---|---|---|---|
| 6,789,215 B1 * | 9/2004 | Rupp et al. ................. 714/38.14 |
| 6,968,446 B1 * | 11/2005 | McGrath ...................... 712/229 |
| 7,478,118 B2 | 1/2009 | Tysowski et al. |
| 7,979,494 B1 * | 7/2011 | Golovin et al. ............... 709/206 |
| 8,051,491 B1 * | 11/2011 | Cavage et al. ................. 726/30 |
| 2001/0025311 A1 * | 9/2001 | Arai et al. ..................... 709/225 |
| 2003/0135759 A1 * | 7/2003 | Kim et al. ..................... 713/201 |
| 2004/0064736 A1 * | 4/2004 | Obrecht et al. ............... 713/201 |
| 2005/0203881 A1 | 9/2005 | Sakamoto et al. |
| 2006/0010485 A1 * | 1/2006 | Gorman ............................ 726/3 |
| 2006/0031933 A1 * | 2/2006 | Costa et al. ..................... 726/22 |
| 2007/0005992 A1 * | 1/2007 | Schluessler et al. .......... 713/193 |
| 2007/0239961 A1 * | 10/2007 | Noguchi et al. .............. 711/216 |
| 2007/0261121 A1 | 11/2007 | Jacobson |
| 2008/0005778 A1 | 1/2008 | Chen et al. |
| 2008/0015808 A1 | 1/2008 | Wilson et al. |

(Continued)

OTHER PUBLICATIONS

Espacenet search, Espacent Result List, Jan. 2012.*

(Continued)

*Primary Examiner* — Andy Rao
*Assistant Examiner* — Shan Elahi
(74) *Attorney, Agent, or Firm* — Kenyon & Kenyon LLP

(57) ABSTRACT

A system and method for performing a security check may include using at least one processor to periodically check a status of a flag, generate and store a baseline representation of modules stored on the device where the flag is determined to be set to a first state, and, where the flag is determined to be set to a second state, generate an active representation of modules stored on the first device, compare the active representation of modules to the baseline representation of modules, and, responsive to a determination in the comparing step of a difference between the baseline and active representations of modules, output an alert. The flag status may depend on an association of the device with one of a plurality of authorization policies, each mapped to one of the two states. Results of the comparison may be appended to an activity log of the device.

23 Claims, 4 Drawing Sheets

U.S. PATENT DOCUMENTS

| | | |
|---|---|---|
| 2008/0016547 A1 | 1/2008 | Anderson et al. |
| 2008/0028467 A1 | 1/2008 | Kommareddy et al. |
| 2008/0034439 A1 | 2/2008 | Chen et al. |
| 2008/0098479 A1 | 4/2008 | O'Rourke et al. |
| 2008/0134175 A1* | 6/2008 | Fitzgerald et al. ............... 718/1 |
| 2008/0178285 A1* | 7/2008 | Perlman et al. ................ 726/21 |
| 2008/0196104 A1 | 8/2008 | Tuvell et al. |
| 2008/0304668 A1 | 12/2008 | Williams et al. |
| 2008/0310631 A1* | 12/2008 | Lott ............................. 380/255 |
| 2009/0077664 A1* | 3/2009 | Hsu et al. ....................... 726/24 |
| 2009/0327355 A1* | 12/2009 | Wong et al. ................... 707/201 |

OTHER PUBLICATIONS

International Search Report dated Feb. 23, 2010 issued in corresponding PCT Application No. PCT/US09/59033.

International Preliminary Report on Patentability dated Mar. 1, 2012 issued in corresponding PCT Application No. PCT/US09/59033.

* cited by examiner

SYSTEM AND METHOD FOR DETECTION OF NON-COMPLIANT SOFTWARE INSTALLATION

FIELD OF THE INVENTION

The present invention relates to a method and system for detecting non-compliant installation of software on a device, for providing notification thereof, and for providing a method to update the device by removal or new installation of software.

BACKGROUND INFORMATION

Existing systems may detect malware on a device, e.g., a computer, by scanning for a fingerprint or signature of the malware. For example, anti-virus software may be constantly updated with new signatures of known bad software, and it then scans and finds the signature of the malware on the device. This method may also be used for intrusion detection systems for network infrastructures or computer hosts. An alternate method is to compare software in the device with a known good baseline. This method is understood to be effective only when the software is static with few or no unknown changes. Many false positives would be generated if the files supporting the legitimate software are changed dynamically by the users.

Challenges that arise with respect to malware detection, particularly on small mobile devices, may include: (1) lack of computing power; (2) lack of battery power; (3) dynamicity of content on the device; (4) use of device dependent operating platforms; and (5) lack of security controls on the devices. Additional challenges are inevitable in enterprise models of mobile communication, e.g., corporate BLACKBERRY®. Enterprise solutions pose additional challenges due to the distributed nature of the infrastructure, sensitivity of data in an enterprise, and/or scalability of a security solution required to detect any unauthorized data access.

SUMMARY

Exemplary embodiments and/or exemplary methods of the present invention are directed to these challenges, by providing a system(s) and method(s) for performing a security check to detect unauthorized software, such as malware or other non-compliant software, installed on a device, e.g., a mobile communication and/or computing device, and alerting a user and/or an administrator of the device of the detected malware. The system and method, according to example embodiments of the present invention, also provide, for example, a highly scalable operational workflow to deal with dynamic content on even thousands of devices.

Software may be installed on the device(s) without generating a false positive detection of non-compliant software. Moreover, where non-compliant software installation is detected, the system and method, according to an example embodiment of the present invention, outputs an alert, including, for example, an indication of a context in which the detection occurred.

A non-exhaustive list of example devices to which the system and method of the present invention may be applied includes a Personal Digital Assistant (PDA), such as a BLACKBERRY® device; mobile phones; and personal computers (PCs), such as a desktop or laptop computer. Importantly, the system and method may be applied to a small communication and/or computing device that has limited computing power.

An example security method for detecting a non-compliant software installation includes, at least one processor performing the following on a periodic basis: determining a settable state of a device, and, depending on the settable state of the device, either generating a baseline representation of software executable modules stored on the device, or comparing a current representation of the software modules stored on the device to a previously generated baseline representation of the software modules stored on the device, and outputting an alert if a discrepancy is determined in the comparing step.

An example security method for detecting non-compliant software installation includes, performing, on a periodic basis, using at least one computer processor, the following: determining a status of a flag, where the flag is determined to be set to a first state, generating and storing a baseline representation of modules stored on a first device, and where the flag is determined to be set to a second state: generating an active representation of the modules stored on the first device, comparing the active representation of the modules to the baseline representation of the modules, determining if there is a difference between the baseline and the active representations of the modules, and outputting an alert if there is a difference between the baseline and the active representations of the modules.

A period of the periodic performance may be controlled by a timer. The timer may be automatically reset subsequent to the generation of the baseline representation of the modules where the flag is determined to be set to the first state. The timer may be automatically reset subsequent to the comparison of the baseline and active representations of the modules where the flag is determined to be set to the second state.

The method may further include providing a user interface via which to obtain user input, and changing the status of the flag from one of the first and the second states to another of the first and the second states when the user input is received via the user interface.

The method may further include storing a mapping of each of more than two defined authorization policies to a respective one of the first and second states. The user input may include a selection of one of the defined authorization policies. The changing of the status may include changing the state of the flag to the state to which the selected policy is mapped.

The user input may be input on a second device remote from the first device and, responsive to the user input, the status of the flag may be changed for a plurality of devices, the plurality of devices including the first device.

The method may further include, on the periodic basis, where the flag is determined to be set to the second state, appending results of the comparison to an activity log, which notes events that occurred on the first device prior to and/or subsequent to performing of the comparing step.

The appended results may exclude portions of results of the comparison indicating consonance between the baseline and active representations of modules.

The method may further include scanning, by the at least one processor, the activity log for the appended results, and generating a redacted version of the activity log, the redacted log including the appended results and a subset of entries of the activity log preceding and/or following the appended results.

Each of the generations of the representations of the modules may include, (i) for each module stored on the first device, generating a respective first data set based on contents of the module, and (ii) generating a second data set based on a combination of the first data sets generated during the respective representation generation.

The method may further include comparing the second data set generated during the active representation generation to the second data set generated during the baseline representation generation. The method may further include, conditional upon determining, in the step of comparing the second data sets, that there is a difference between the second data sets, comparing each of the first data sets generated during the active representation generation to the first data sets generated during the baseline representation generation. The alert may include an identification of each module corresponding to a first data set of the active representation generation for which a match is not found in the baseline representation generation.

The generation of the first data sets may include applying a first hash function to each of the modules.

For each of the representation generations, the respective generation of the second data set may include applying the first hash function or a second hash function to a combination of the first data sets generated during the respective representation generation.

The alert may include a list of all of the modules stored on the first device.

The alert may be output via an e-mail message and/or a pop-up message.

An example security method for detecting non-compliant software installation includes comparing, with a computer processor, a current representation of modules stored on a device to a baseline representation of modules stored on the device, and appending, with the processor, results of the comparison to an activity log, which notes events that occurred on the device prior to performance of the comparison.

The method may further include outputting an alert in response to determining, in the comparing step, that there is a discrepancy between the current and baseline representations.

The alert may include a redacted version of the activity log including the appended results and a subset of the event notations.

An example security method for detecting non-compliant software installation includes at least one computer processors performing the following: storing a mapping of each of more than two defined authorization policies to one of two states; for a first device associated with one of the defined authorization policies, setting a state of the first device to the one of the two states to which the policy, with which the first device is associated, is mapped; and, depending on which of the two states is set for the first device, either (i) determining whether to generate a baseline representation of modules stored on the first device or (ii) comparing a current representation of modules stored on the first device to the baseline representation.

The method may further include providing a user interface via which a section of one of the defined authorization policies is selectable, and, responsive to a selection, via the user interface, of an authorization policy, changing the authorization policy with which the first device is associated to the selected authorization policy.

The user interface may be provided on a second device remote from the first device.

In an example embodiment of the present invention, a device for detecting non-compliant software installation includes a memory storing a plurality of software modules and an identification of a state of the device. The device further includes a processor configured to perform on a periodic basis the following: checking the memory to determine the state of the device; where the device is determined, in the checking step, to be set to a first state, generating and storing in the memory a baseline representation of the modules stored in the memory; and, where the device is determined, in the checking step, to be set to a second state, generating an active representation of the modules stored in the memory, comparing the active representation of modules to the baseline representation of modules, determining if there is a difference between the baseline and active representations of modules, and outputting an alert if there is a difference between the baseline and active representations of modules.

In an example embodiment of the present invention, a system for detecting non-compliant software installation includes at least one memory device storing a plurality of software modules and an identification of a state of a device. The system further includes at least one processor configured to perform on a periodic basis the following: checking the at least one memory device to determine the state of the device; where the device is determined, in the checking step, to be set to a first state, generating and storing in the at least one memory device a baseline representation of the modules stored in the at least one memory device; and, where the device is determined, in the checking step, to be set to a second state, generating an active representation of the modules stored in the at least one memory device, comparing the active representation of modules to the baseline representation of modules, determining if there is a difference between the baseline and active representations of modules, and outputting an alert is there is a difference between the baseline and active representations of modules.

In an example embodiment of the present invention, a hardware computer-readable medium has a program stored thereon. The program is executable by a processor and includes a program code arrangement for detecting a non-compliant software installation by performing the following: checking and determining a status of a flag; where the flag is determined to be set to a first state, generating and storing a baseline representation of modules stored on a device; and, where the flag is determined, in the checking step, to be set to a second state: generating an active representation of modules stored on the device, comparing the active representation of modules to the baseline representation of modules, determining if there is a difference between the baseline and the active representations of the modules, and outputting an alert if there is a difference between the baseline and the active representations of the modules.

The various components and/or methods described herein may be practiced, each alone, or in various combinations.

An example embodiment of the present invention is directed to a processor, which may be implemented using any conventional processing circuit and device or combination thereof, such as, for example, a central processing unit (CPU) of a personal computer (PC) or other workstation processor, to execute code provided, for example, on a hardware computer-readable medium, including any conventional memory device, to perform any of the methods described herein, alone or in combination. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a hardware computer-readable medium, as described above for example, having stored thereon instructions executable by a processor to perform the methods described herein.

An example embodiment of the present invention is directed to a method, performed via a hardware component or machine, for example, of transmitting instructions executable by a processor to perform the methods described herein, or portions thereof.

In the drawings, which are not necessarily drawn to scale, like numerals may describe similar components in different views. Like numerals having different symbolic suffixes may represent different instances of similar components. The drawings illustrate generally, by way of example, but not by way of limitation, various embodiments discussed in the present document.

DETAILED DESCRIPTION

Figure 1:
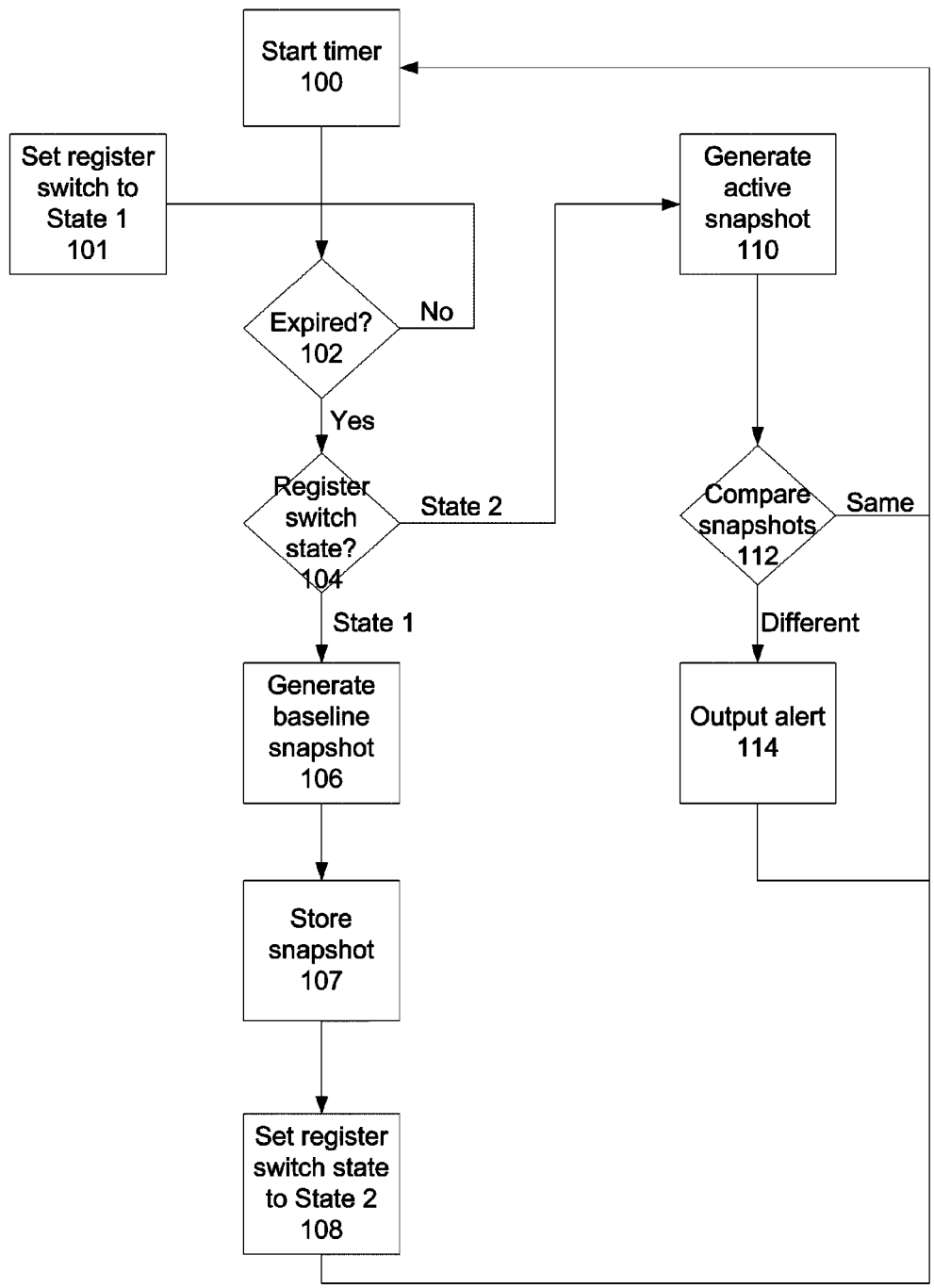
FIG. 1 is a flowchart that illustrates an example method of the present invention for determining whether a non-compliant software installation has occurred on a device.

FIG. 1 is a flowchart that illustrates an example method of the present invention for determining whether a non-compliant software installation has occurred on a device. An application may be installed on the device for performing the method of FIG. 1. Execution of the application may begin upon start-up of the device. As illustrated in FIG. 1, the system and method may periodically generate a baseline or perform a comparison to the baseline.

When the application initially begins, the system and method may start a timer at step 100. Any suitably appropriate timer, including software and/or hardware components (e.g., that use a system clock) may be used for the timer described as to the method illustrated in FIG. 1.

At step 102, the system and method may determine whether the timer has expired. For example, the reaching, by the timer, of a predetermined timer value or an end of a predetermined timer interval (e.g., determined by subtraction of timer values) may be considered by the system and method as expiration of the timer. If the timer has not expired, the system and method may cycle back to re-check expiration of the timer. The cycle may be implemented via an interrupt that occurs in response to expiration of the timer.

Upon expiration of the timer, the system and method may check a register switch state at step 104. The register switch state may be determined, for example, with reference to a bit flag that can be set to one of two states. For example, the bit may be set to 0 or 1, each representing a corresponding state. A first of the states, State 1, may be set to allow for installation, deletion, and/or modification of the executable software modules installed on the device. A second of the states, State 2, may be set to disallow said installation, deletion, and/or modification of the executable software modules installed on the device.

If the register switch state corresponds to State 1, the system and method may proceed to step 106 to begin the baseline generation. If the register switch state corresponds to State 2, the system and method may proceed to step 110 to perform the comparison to the baseline.

At step 106, the system and method may generate a baseline snapshot of the executable software modules installed on the device. At step 107, the system and method may store the baseline snapshot in permanent memory. At step 108, the system and method may set the register switch to State 2. The system and method may then return to step 100 to restart the timer.

In an example embodiment, step 108 is performed in response to completion or storage of the generation of the baseline snapshot. However, other variations may be implemented. For example, according to an example embodiment, the register switch may be reset to State 2 in response to turning on the device for which the security check is performed. According to this embodiment, the baseline snapshot may be continuously (on a periodic basis) regenerated prior to turning on the device again at a later time. Alternatively, restarting of the timer at step 100 may be performed only subsequent to the next restart of the device. In yet another example embodiment, step 108 may be performed in response to user input, rather than automatically, so that the restarting of the timer at step 100 does not occur until after receiving such user input. An example embodiment may provide for resetting of the register switch to State 2 in response to either user input or restarting of the device, whichever occurs first. According to these embodiments, subsequent to step 106 and/or step 107, the system and method may proceed to step 100 prior to performing step 108.

According to an example embodiment of the present invention, when the application is executed for the first time, the register switch may be initially set to State 1. Alternatively, by default the register switch may be set to State 2 until it is changed in response to user input. While the register switch is initially set to State 1, software may be installed, deleted, and/or modified. The baseline that is subsequently generated reflects such changes to the installed software modules.

After the register switch is set to State 2, user input may be obtained, responsive to which the system and method may, at step 101, set the register switch to State 1. For example, the user input may be an interrupt event that causes the change to the register switch state.

In an example embodiment of the present invention, as long as the register switch is set to State 1, the system and method may provide that the timer is not started. According to this embodiment, subsequent to step 106 and/or 107, step 100 may be performed only after the state is set to State 2 at step 108.

Moreover, in an example embodiment, if the timer is started while the register switch is set to State 2, the timer and the remaining steps of FIG. 1 may be halted in response to a change of the state of the register switch to State 1. According to this embodiment, the system and method may continue the method of FIG. 1, beginning with step 106, in response to a user input for resetting the register switch to State 2. According to this embodiment, step 104 may be omitted.

Instead, the method may proceed directly from step 102 to step 110, and steps 106 and 107 may be performed in response to the interrupt event of resetting the register switch to State 2. (That is, step 108 which is performed prior to steps 106 and 107 according to this embodiment.) Stated otherwise, according to this embodiment, the system and method periodically compares an active snapshot to a baseline snapshot as long as the register switch is set to State 2, except that, in response to the change of the state to State 2, the baseline snapshot is generated. Further, according to this embodiment, none of the steps of FIG. 1, other than step 108 to change the register switch state, are performed while the register switch is set to State 1.

As explained above, if the register switch state corresponds to State 2, the system and method may proceed to step 110 to perform the comparison to the baseline. At step 110, the system and method may generate an active snapshot of the executable software modules. At step 112, the system and method may compare the active snapshot to the baseline snapshot stored at the latest performance of step 107.

If the system and method determines that the snapshots are the same, the system and method may return to step 100 to restart the timer.

If the system and method determines that the snapshots are not the same, the system and method may, at step 114, generate an alert to indicate the detection of a discrepancy between the state of the currently installed software modules and the state of the software modules installed during the previous baseline generation. The system and method may subsequently return to step 100 to restart the timer.

In an example embodiment of the present invention, subsequent to the step 114, user input may be obtained for resetting the register switch again to State 1 at step 101. Accordingly, a new baseline snapshot may be generated so that an alert of a discrepancy is not repeatedly generated and output. Alternatively, the system and method may automatically return to step 101 subsequent to the detection of the discrepancy (for example, prior to restarting the timer). Alternatively, upon detection of the discrepancy, the system and method may automatically store the active snapshot as the baseline snapshot.

Figure 2:
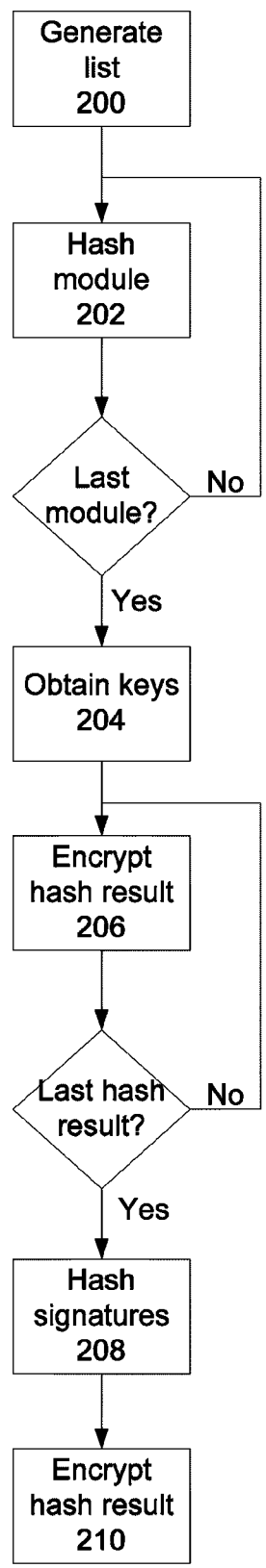
FIG. 2 is a flowchart that illustrates steps which may be performed for generation of snapshots, according to an example method of the present invention.

FIG. 2 is a flowchart that illustrates further details of steps which may be performed for generating the snapshots in steps 106 and 110, according to an example method of the present invention. At step 200, the system and method generates a list of the executable software modules stored on the device. At step 202, beginning with the first listed module, the system and method applies a hashing algorithm to the file. The hashes may be performed using any suitably appropriate hashing algorithm, including, for example, a Message-Digest algorithm (MD5), a cryptographic hash function. The system and method returns to step 202 to hash the next listed module until the last module has been hashed. Any change to a module would modify the hash, resulting in a discrepancy when the snapshots are compared.

Once the last module has been hashed, the system and method, at step 204, obtains from secure persistent storage two keys, key 1 and key 2. The system and method, at step 206, using key 1, encrypts the individual hash results to obtain respective digital signatures, beginning with the first hash result. The system and method returns to step 206 to encrypt the next hash result until the last hash result has been encrypted.

At step 208, the system and method applies a hashing algorithm (such as, for example, the MD5 hash function) to the signatures obtained at step 206, in combination, to obtain a single hash result corresponding to the software modules in combination. At step 210, the system and method, using key 2, encrypts the single hash result to obtain a master digital signature.

Referring back to FIG. 1, the master digital signature of step 106 may be stored at step 107 as the baseline snapshot. Similarly, the master digital signature of step 110 may be compared at step 112 to the master digital signature stored at step 107. In an example method of the present invention, the individual respective digital signatures of the individual software modules may additionally be stored and/or compared as further described below as to FIG. 3. For example, referring back to FIG. 1, the respective digital signatures and the master digital signature obtained during execution of, respectively, substeps 206 and 210 of step 106 may be stored at step 107 as the baseline snapshot. Similarly, the master digital signature of step 110 may be compared at step 112 to the master digital signature stored at step 107, and subsequently the individual respective digital signatures of step 110 may be compared at step 112 to the individual digital signatures stored at step 107.

Figure 3:
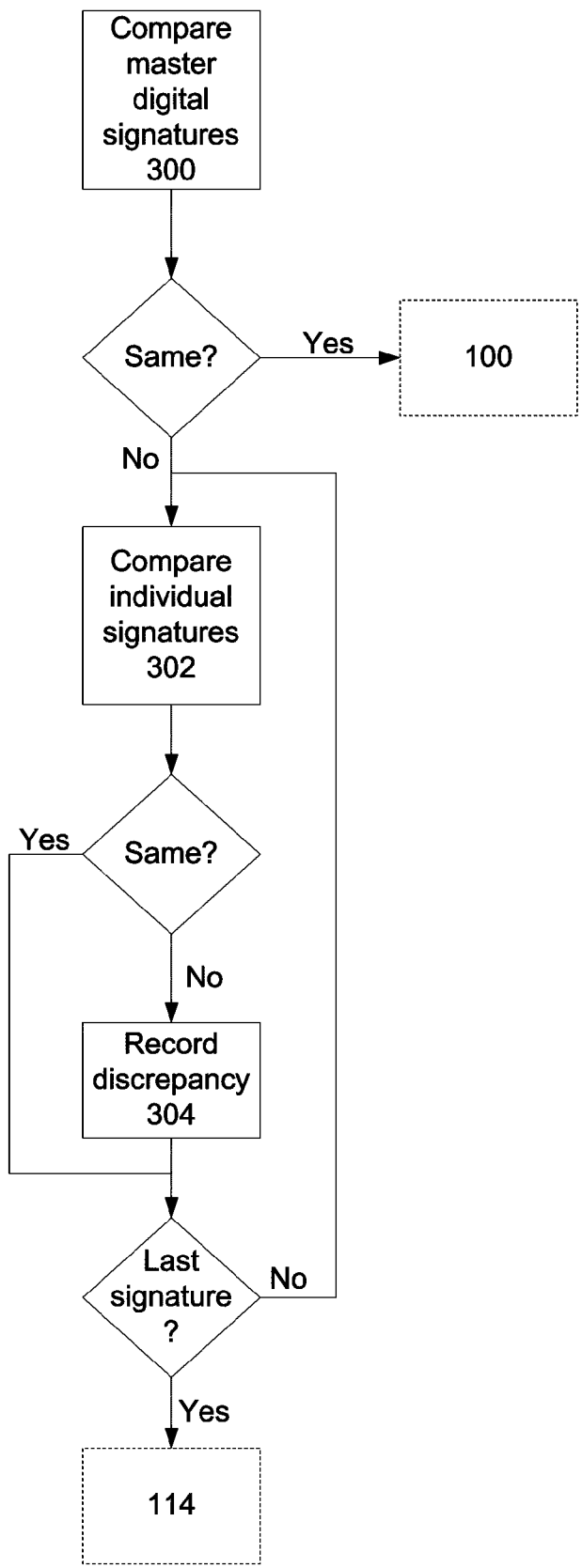
FIG. 3 is a flowchart that illustrates steps which may be performed for a snapshot comparison, according to an example method of the present invention.

FIG. 3 is a flowchart that illustrates further details of steps which may be performed for the snapshot comparison in step 112, according to an example method of the present invention. At step 300, the system and method may compare the master digital signature obtained for the periodic security check at step 110 to the master digital signature stored at step 107. If the master digital signatures are the same, then the system and method may proceed to step 100 as described above. If the master digital signatures are not the same, then the system and method may proceed to step 302 to compare the individual digital signatures of the respective software modules obtained at step 206 of both steps 106 and 110, beginning with a first one of the digital signatures.

If the compared digital signatures are the same, then the system and method may return to step 302 to compare the next set of individual signatures, until the last of the signatures have been compared. If the compared digital signatures are different, then the system and method may proceed to step 304 to record the discrepancy, and then return to step 302 to compare the next set of individual signatures, until the last of the signatures have been compared.

If a software module is removed subsequent to the generation of the baseline snapshot, there may be fewer signatures in the active snapshot than in the baseline snapshot. Accordingly, aside from traversing the set of individual signatures obtained during the generation of the active snapshot, the system and method may traverse the set of individual signatures, obtained during the generation of the baseline snapshot, to determine whether a signature is missing from the active snapshot. Where a software module is missing, the system and method may note the removal of the corresponding software module at step 304.

Similarly, if a software module is added subsequent to the generation of the baseline snapshot, there may be fewer signatures in the baseline snapshot than in the active snapshot. Accordingly, aside from traversing the set of individual signatures obtained during the generation of the baseline snapshot, the system and method may additionally traverse the set of individual signatures obtained during the generation of the active snapshot. Where a software module is added, the system and method may note the addition of the corresponding software module at step 304.

That is, it may be required to separately traverse each set of signatures to find additions or removal of software modules subsequent to the generation of the baseline snapshot. In an example embodiment of the present invention, for each of the individual signatures obtained during the generation of the active snapshot, the system and method may traverse the set of individual signatures obtained during the generation of the baseline snapshot to determine whether any of the signatures of the baseline snapshot match.

Similarly, for each of the individual signatures obtained during the generation of the baseline snapshot, the system and method may traverse the set of individual signatures obtained during the generation of the active snapshot to determine whether any of the signatures of the active snapshot match. Such complete traversal at both ends may be omitted for those signatures that have been previously matched. For example, if during traversal of the signatures of a first one of the snapshots, a match is found to a signature of a second one of the snapshots, then, for the signature of the second snapshot, complete traversal of the signatures of the first snapshot may be omitted since the signatures have been matched. Other matching algorithms may alternatively be applied.

In an alternative example embodiment, complete traversal may be performed even after a match is found in a previous traversal to determine whether a duplicate of the software module has been added. In an example embodiment of the present invention, the system and/or method may also check whether a duplicate has been removed.

In an example embodiment of the present invention, the discrepancies recorded at step 304 (including, for example, along with an indication of the software modules to which the discrepancies correspond) may be used as the alert or as part of the alert at step 114. Alternatively, the alert may include the complete list of compared signatures and/or an indication of each signature's corresponding software module. For those signatures for which a discrepancy has been found, the system and method may include in the list a notation or icon flagging that a discrepancy has been found as to the signature. In an example embodiment, the discrepancies which are flagged may include those which correspond to an addition or removal of a software module.

Alternatively or additionally, results of the comparison, including any recorded discrepancies, or, where no discrepancies are detected, an indication of the consonance of the snapshots, may be stored at a user-accessible location. For example, the alert may prompt the user to obtain the comparison log from the user-accessible location. In an example embodiment of the present invention, the system and method may provide a link in the alert for obtaining the comparison log from the user-accessible location.

The alert generated at step 114 may be output at the device, on which are loaded the software modules for which the snapshots are generated at steps 106 and 110, and for which the security check is performed. The alert may be, for example, a persistent dialog box which remains at the forefront of the display screen until acknowledged by user input. In an example embodiment, the output of the alert may be by an application that performs the security check and generates the alert, and may be in response to the result of the security check. Alternatively or additionally, the system may transmit the alert to another application, which may output the alert at any device on which the other application is executed. For example, the security check application may transmit the alert as an e-mail to an e-mail application. The alert may be output by the e-mail application, which may be running on the device on which the security check was performed at another device. Similarly, the security check application may transmit the alert as a text message (for example, using PIN, SMS, and/or MDS), and/or as a phone call, using a text to speech application, to another device or the same device on which the security check is performed.

In an example embodiment of the present invention, the system and method may output the alert to an administrator. The administrator may have access to the alert at the device on which the security check is performed or at a remote device. For example, an administrator may manage groups of devices (for example, of a number of users) for which security checks are performed. Alerts and other messages generated at the individual devices may be transmitted to a particular device or devices associated with the administrator, or to a particular account associated with the administrator and to which the administrator has access via a log-in at a number of devices.

In an example method of the present invention, results of multiple security checks performed over time (for example, results of all security checks or a predetermined number of security checks) may be stored, for example, in a first-in-first-out (FIFO) memory in the case that results of only a predetermined number of security checks are stored. The results may be stored with the date and time of the security check, the expected and actual master digital signatures and/or other signatures, and/or a list of the executable modules stored at the time of the security check. In an example embodiment, only such results obtained in a check in which a discrepancy was found are stored. In an alternative example embodiment, even results obtained in a check in which a discrepancy was not found are stored. The results may be stored on the device for which the check was performed and/or on a remote device.

In an example method of the present invention, results of the comparison performed at step 112 may be inserted into an activity log of the device for which the security check is performed. The activity log may be updated (for example, continuously according to a sequence or approximate sequence of events that occurs at the device). Accordingly, the activity log may provide a context to the results of the security check (that is, results of the snapshot comparison). For example, review of the events recorded in the log prior to and proximal in time with the recordation in the security log of the results of the security check may be useful for investigating the cause of the determined discrepancy between snapshots.

For example, the security check may be performed on a BLACKBERRY® device, and results of the security check may be inserted into the activity log of the BLACKBERRY® device, which may be retrieved (for example, by selecting the key combination ALT-lglg on the BLACKBERRY® device). For example a JAVA™ Development Tool Kit may be used to modify the device so that the activity log records the results of the security check.

In an example embodiment, the entire log of the security check may be inserted into the activity log. Alternatively, only the recorded discrepancies of the security check may be inserted into the activity log.

In an example embodiment of the present invention, the system and method may transmit the activity log or portions thereof to a remote device (for example, of an administrator) or to an application which may be accessible at other devices (for example, of an administrator), e.g., as an e-mail attachment.

In an example embodiment of the present invention, the system and method may scan the activity log for those portions corresponding to results of a security check. The system and method may generate a redacted version of the activity check, including the results of the security check and a limited number of other activity entries proximal in sequence to the entries corresponding to the results of the security check. For example, the other entries may be limited to only entries preceding the entries corresponding to the results of the security check, since the preceding events may be of greater importance with respect to determining a cause of the discrepancies determined during the security check. In an alternative example embodiment, the other entries of the redacted version of the activity log may additionally include entries logged subsequent to the entries corresponding to the security check results to provide additional context.

In an example embodiment of the present invention, the entries corresponding to the other events included in the redacted version of the activity log may be limited to a certain predetermined number of entries preceding and/or following the entries corresponding to the results of the security check. Alternatively or additionally, the entries corresponding to the other events included in the activity log may be limited to those which correspond to a predetermined time interval preceding and/or following the entries corresponding to the results of the security check. In an example embodiment of the present invention, the predetermined numbers and/or predetermined time periods may be the same or different for the preceding entries than for the following entries.

According to the example embodiment(s) that provide for the generation of a redacted version of the activity log, the redacted version of the activity log may be accessible at the device at which the security check is performed and/or may be transmitted to another device and/or application accessible at one or more devices, as noted above with respect to the complete activity log.

In an example embodiment of the present invention, the scan of the activity log for generation of the redacted version of the activity log may be performed at the device at which the security check is performed, in response to completion of a security check in which a discrepancy is determined, and after the activity log is updated with the results of the security check. According to the embodiment that provides for transmission of the redacted version of the activity log to a remote device or application, the redacted version may then be transmitted subsequent to the generation of the redacted version.

In an alternative example embodiment of the present invention, the activity log may be transmitted to a device or account of an administrator. The device or a device at which the account is accessed may then automatically scan the activity log for results of a security check to generate the redacted version of the security check. The redacted version may then be stored at the device which generated the redacted version of the log and/or transmitted back to the device for which the security check was performed. In an example embodiment of the present invention, the automatic scan may be performed conditional upon that a discrepancy has been detected during a security check performed at the device to which the activity log corresponds.

In an alternative or additional example embodiment of the present invention, the scan may be manually started (for example, in response to user input).

In an alternative example embodiment of the present invention, the entire activity log may be output. The initially displayed portion of the activity log may be in accordance with the scan. For example, the system and method may initially display a portion of the activity log beginning with a first entry of the results of the security check, a first entry corresponding to a discrepancy detected by the security check, and/or an entry preceding but proximal to the first entry of the results of the security check or the first entry corresponding to a discrepancy recorded during the security check. Other entries may then be accessible, for example, via a scrolling or other navigation instruction. For example, the first displayed entry may be a predetermined number of entries preceding the first entry of the results of the security check, or may correspond to a predetermined amount of time prior to the log of the first entry of the results of the security check or the first entry corresponding to a discrepancy recorded during the security check.

While the embodiments described above refer to the performance of the security check, described as to FIGS. 1 to 3, at the device at which the software modules are stored and for which device the security check is performed, in an alternative example embodiment of the present invention, the security check may be performed at a remote device. For example, the baseline and active snapshots may be transmitted to a remote device or application (for example, of an administrator) for comparison at the remote device or other device associated with the other application to which the snapshots are transmitted. (Alternatively, the remote device may be a backend server serving the device for which the security check is performed.) The remote device or application may transmit an alert back to the device on which the software modules are stored (for example, the device for which the security check is performed) and/or to an administrator device or application.

As described above as to FIG. 1, at step 101, the system and method may set the register switch to State 1 in response to user input and, at step 108, the system and method may set the register switch to State 1 or State 2 respectively. In an example embodiment of the present invention, the system and method provides a user interface program for providing a graphical user interface (GUI) in a display device, via interaction with which a user may input data for changing the register switch state for step 101 and/or step 108 (depending on the implemented embodiment, as described above). The display device may be integrated with the device for which the security check is performed. In an example embodiment, access to the GUI may be set to be limited to only authorized users (for example, identified by a password and/or other identification).

Alternatively or in addition, the display device may be integrated with a remote device, where the GUI is accessible to authorized users (for example, an administrator and/or a user to whom is assigned the device for which the security check is performed). For example, an administrator at a central location may transmit data interfacing with the security check application running on the device for which the security check is performed to reset the register switch to allow for the modifications to be made. For example, where a change is to be performed across an entire enterprise which encompasses multiple devices (for example, where each device is assigned to a respective user), the data may be transmitted to all of the devices. If the change to the register switch to State 1, for example, is to be made to only one or a few of the devices belonging to the enterprise, then the data may be addressed to those specific devices.

In an example embodiment of the present invention, various authorization policies may be defined. Each device may be associated with one or more of the policies (for example, where each authorization policy corresponds to a respective level of authority for entering changes, such as with respect to stored software modules, to a device with which it is associated). The system and method may group a first subset of the policies into a "relaxed" group corresponding to register switch State 1 and a second subset of policies into a "non-relaxed" group corresponding to register switch State 2.

While a device is associated with one of the policies of the relaxed group, the register switch of the device is accordingly set to State 1, so that the user can modify the software modules stored on the device without triggering an alert. If a change is to be made on a device associated with a non-relaxed policy, then the administrator at the central location may access the GUI to change the policy of the device to one of the relaxed policies. In response to such a change, the system and method changes the register switch state to State 1.

In an example embodiment of the present invention, the system and method may periodically check the policy and change the state of the register switch where appropriate.

Figure 4:
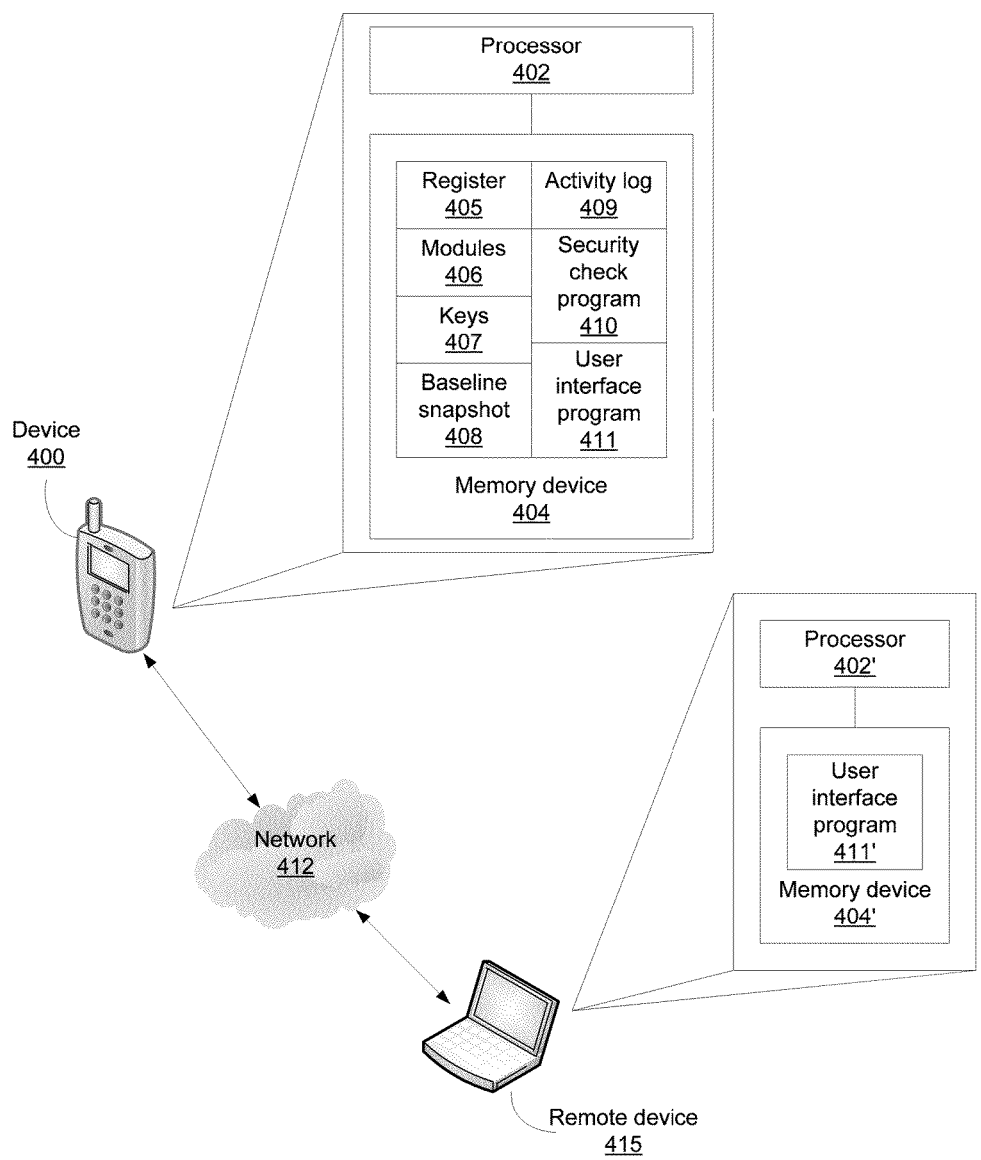
FIG. 4 is a diagram that illustrates components of a system, according to an example embodiment of the present invention.

FIG. 4 illustrates components of a system, according to an example embodiment of the present invention for implementing the methods described herein. The system may include a device 400 (for example a PDA, such as a BLACKBERRY® device, a mobile phone, a PC, such as a desktop or laptop computer, or any other device on which software modules may be stored). The device 400 may include a processor 402 and a memory device 404. The memory device 404 may include a register 405 (or a stored flag data) that is set to the first or second state, and may store software executable modules 406, one or more keys 407, a baseline snapshot 408 generated based on the stored software modules 406, an activity log 409, a security check program 410, and a user interface program 411.

The processor 402 may execute the security check program 410 to perform one or more of the steps of the security check method(s), as described in detail above as to FIGS. 1 to 3. For example, the processor 402 may periodically check the state of the register 405, which may be a one bit register set (for example, to either 0 or 1. Depending on the state to which the register 405 is set, the processor may either generate the baseline snapshot 408, or may generate an active snapshot for comparison with the baseline snapshot 408 previously stored in the memory device 404.

For generation of the baseline snapshot 408 and the active snapshot, the processor 402 may apply a hash function to each of the software modules 406. The processor may obtain one of the keys 407 and encrypt each hash result using the obtained key 407 to obtain a respective digital signature for the respective one of the software modules 406. The processor 402 may further apply the same or a different hash function to a combination of the digital signatures. The processor 402 may obtain another of the keys 407 (or use the previously used key 407) and encrypt the hash result using the obtained second (or same) key 407 to obtain a master digital signature. In an example embodiment, encryption may be omitted.

Results of the comparison may be appended to the activity log 409, which may additionally log other events that occur at the device 400. An alert, which may include the activity log 409 or a redacted version thereof, regarding results of the comparison, may be output by the processor 402 executing the user interface program 411. The user interface program 411 may include, for example, an e-mail program and/or a pop-up generation program. The user interface program 411 may also provide a GUI via which the state of the register 405 may be directly set or indirectly set via a setting of an authorization policy.

One or more remote devices 415 may be in communication with the device 400, e.g., via a network 412. The network 412 may be a local area network (LAN), wide area network (WAN), or a combination thereof. Any suitably appropriate network topology and network components may be used. The network 412 may be or may include, for example, the Internet. The remote device 415 may include a processor 402' and a memory device 404'. The memory device 404' may store a user interface program 411'. The processor 402' may execute the user interface program 411' to provide a GUI via which to set the state of the register 405 of the device 400 or to set an authorization policy of the device 400, which policy may be mapped to one of the states of the register 405. In response to communication from the remote device 415 of data representing the change of the register state, the processor 402 of the device 400 may change the state of the register 405.

In an example embodiment, the device 400 may transmit to the remote device 415 results of the security check. The results may include the activity log or a redacted version thereof. In an example embodiment, the complete activity log may be transmitted, and the remote device 415 may generate a redacted version thereof. In an example embodiment, the device 400 may also transmit the baseline snapshot 408 to the remote device 415. In an example embodiment, the remote device 415 may store each baseline snapshot 408 generated and transmitted to the remote device 415 by the device 400 to maintain a snapshot history. Such a history may be useful to determine a last authorized state of the device 400. Alternatively or additionally, the snapshot history may be stored locally at the device 400. However, it may be advantageous to instead store the snapshot history only at the remote device 415, e.g., where the remote device 415 has more storage capacity than the device 400.

While only a single device 400 for which a security check is performed is illustrated in FIG. 4, the remote device 415 may be in communication with and/or set security check parameters of other devices for which the security check is to be performed. While certain components are shown to be included and/or stored in the memory device 404 of the device 400, some of the components may be included instead or additionally in the memory device 404' of the remote device 415. For example, the generation of the snapshots, the comparison of the snapshots, the maintaining of the register state, the maintaining of the activity log, and/or the appending of results of the security check to the activity log may be performed at the remote device 415. In an example embodiment, the remote device 415 may be any device at which a user may log into the user interface program 411'.

The above description is illustrative, and is not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented security method for detecting non-compliant software installation, the method comprising:
    performing, on a periodic basis and using at least one computer processor, the following:
    (I) determining to which of a first state and a second state a flag is set, wherein the setting of the flag to the first state allows at least one of installation, deletion, and modification of software without alert, and the setting of the flag to the second state disallows the at least one of the installation, deletion, and modification of the software without alert; and
    (II) performing one of the following depending on the determination of the determining step:
        (i) based on the determination of the determining step being that the flag is set to the first state:
            (a) generating a baseline representation of modules stored on a first device; and
            (b) storing the generated baseline representation; and
        (ii) based on the determination of the determining step being that the flag is set to the second state:
            (a) generating an active representation of the modules stored on the first device;
            (b) comparing the active representation of the modules to the baseline representation of the modules;
            (c) determining if there is a difference between the baseline and the active representations of the modules; and
            (d) outputting an alert if there is a difference between the baseline and the active representations of the modules.

2. The method of claim 1, wherein:
    a period of the periodic performance is controlled by a timer,
    the timer is automatically reset subsequent to the generation of the baseline representation of the modules where the flag is determined to be set to the first state, and the timer is automatically reset subsequent to the comparison of the baseline and active representations of the modules where the flag is determined to be set to the second state.

3. The method of claim 1, further comprising:
providing a user interface via which to obtain user input; and
changing a status of the flag from one of the first and the second states to another of the first and the second states when the user input is received via the user interface.

4. The method of claim 3, further comprising:
storing a mapping of each of more than two defined authorization policies to a respective one of the first and second states, wherein the user input includes a selection of one of the defined authorization policies, and wherein the changing of the status includes changing the state of the flag to the state to which the selected policy is mapped.

5. The method of claim 3, wherein the user input is input on a second device remote from the first device and, responsive to the user input, the status of the flag is changed for a plurality of devices, the plurality of devices including the first device.

6. The method of claim 1, further comprising:
on the periodic basis, where the flag is determined to be set to the second state, appending results of the comparison to an activity log, which notes events that occurred on the first device prior to performing the comparing step.

7. The method of claim 6, wherein the appended results exclude portions of results of the comparison indicating consonance between the baseline and active representations of modules.

8. The method of claim 6, further comprising:
scanning, by the at least one processor, the activity log for the appended results; and
generating a redacted version of the activity log, the redacted version of the activity log including the appended results and a subset of entries of the activity log preceding the appended results.

9. The method of claim 1, wherein each of the generations of the representations of the modules includes:
(i) for each module stored on the first device, generating a respective first data set based on contents of the module; and
(ii) generating a second data set based on a combination of the first data sets generated during the respective representation generation.

10. The method of claim 9, wherein the comparing step includes:
comparing the second data set generated during the active representation generation to the second data set generated during the baseline representation generation; and
conditional upon determining, in the step of comparing the second data sets, that there is a difference between the second data sets, comparing each of the first data sets generated during the active representation generation to the first data sets generated during the baseline representation generation, wherein the alert includes an identification of each module corresponding to a first data set of the active representation generation for which a match is not found in the baseline representation generation.

11. The method of claim 9, wherein the generation of the first data sets includes applying a first hash function to each of the modules.

12. The method of claim 11, wherein, for each of the representation generations, the respective generation of the second data set includes applying one of the first hash function and a second hash function to a combination of the first data sets generated during the respective representation generation.

13. The method of claim 1, wherein the alert includes a list of all of the modules stored on the first device.

14. The method of claim 1, wherein the alert is output via at least one of an e-mail message and a pop-up.

15. The method of claim 1, further comprising:
on the periodic basis, where the flag is determined to be set to the second state, appending results of the comparison to an activity log, which notes events that occurred on the first device prior to performing the comparing step, wherein the alert includes a redacted version of the activity log, the redacted version of the activity log including the appended results and a subset of the event notations.

16. A computer-implemented security method for detecting non-compliant software installation, the method comprising:
(I) storing a mapping of each of more than two defined authorization policies to one of a first state and a second state;
(II) a for a first device associated with one of the defined authorization policies, setting a state of the first device to the one of the first and second states to which the policy, with which the first device is associated, is mapped; and
(III) on a periodic basis:
(a) determining, by a computer processor, to which of the first and second states the first device is set, wherein the setting of the first device to the first state allows at least one of installation, deletion, and modification of software on the first device without alert, and the setting of the first device to the second state disallows the at least one of the installation, deletion, and modification of software on the first device without alert; and
(b) performing one of the following depending on the determination of the determining step:
(i) based on the determination of the determining step being that the first device is set to the first state, determining, by the processor, whether to generate a baseline representation of modules stored on the first device; and
(ii) based on the determination of the determining step being that the first device is set to the second state:
(1) comparing, by the processor, a current representation of modules stored on the first device to the baseline representation; and
(2) alerting, by the processor, of a discrepancy if a discrepancy is determined by the comparison.

17. The method of claim 16, further comprising:
providing a user interface via which a section of one of the defined authorization policies is selectable; and
responsive to a selection, via the user interface, of an authorization policy, changing the authorization policy with which the first device is associated to the selected authorization policy.

18. The method of claim 17, wherein the user interface is provided on a second device remote from the first device.

19. A device for detecting non-compliant software installation, comprising:
a memory storing a plurality of software modules and an identification of a state of the device; and
a processor configured to:
(I) check the identification in the memory to determine to which of a first state and a second state the device is set, wherein the setting of the device to the first state allows at least one of installation, deletion, and modification of software on the device without alert, and the setting of the device to the second state disallows the at least one of the installation, deletion, and modification of software on the device without alert; and (II) perform one of the following depending on the determination made by the check:
(i) based on the determination of the check being that the device is set to the first state:
(a) generate a baseline representation of the modules stored in the memory; and
(b) store the baseline representation in the memory; and
(ii) based on the determination of the check being that the device is set to the second state:
(a) generate an active representation of the modules stored in the memory;
(b) compare the active representation of modules to the baseline representation of modules;
(c) determine if there is a difference between the baseline and the active representations of the modules; and
(d) output an alert if there is a difference between the baseline and the active representations of the modules.

20. A system for detecting non-compliant software installation, comprising:
at least one memory device storing a plurality of software modules and an identification of a state of a device; and
at least one processor configured to:
(I) check the identification to determine to determine to which of a first state and a second state the device is set, wherein the setting of the device to the first state allows at least one of installation, deletion, and modification of software on the device without alert, and the setting of the device to the second state disallows the at least one of the installation, deletion, and modification of software on the device without alert; and
(II) perform one of the following depending on the determination made by the check:
(i) based on the determination of the check being that the device is set to the first state:
(a) generate a baseline representation of the modules stored in the at least one memory device; and
(b) store the baseline representation in the at least one memory device; and
(ii) based on the determination of the check being that the device is set to the second state:
(a) generate an active representation of the modules stored in the at least one memory device;
(b) compare the active representation of modules to the baseline representation of modules;
(c) determine if there is a difference between the baseline and active representations of modules; and
(d) output an alert if there is a difference between the baseline and active representations of modules.

21. A hardware computer-readable medium having a program stored thereon, the program being executable by a processor, comprising:
a program code arrangement for detecting a non-compliant software installation by performing the following:
(I) determining to which of a first state and a second state a flag is set, wherein the setting of the flag to the first state allows at least one of installation, deletion, and modification of software without alert, and the setting of the flag to the second state disallows the at least one of the installation, deletion, and modification of the software without alert; and
(II) performing one of the following depending on the determination of determining step:
(i) based on the determination of the determining step being that the flag is set to first state:
(a) generating a baseline representation of modules stored on a device; and
(b) storing the generated baseline representation; and
(ii) based on the determination of the determining step being that the flag is set to the second state:
(a) generating an active representation of modules stored on the device;
(b) comparing the active representation of modules to the baseline representation of modules;
(c) determining if there is a difference between the baseline and the active representations of the modules; and
(d) outputting an alert if there is a difference between the baseline and the active representations of the modules.

22. A computer-implemented security method for detecting a non-compliant software installation, the method comprising:
at least one processor performing the following on a periodic basis:
(I) determining to which of a first state and a second state a device is set, wherein the setting of the device to the first state allows at least one of installation, deletion, and modification of software on the device without alert, and the setting of the device to the second state disallows the at least one of the installation, deletion, and modification of the software on the device without alert; and
(II) performing one of the following depending on the determination of the determining step:
(i) based on the determination of the determining step being that the device is set to the first state, generating a baseline representation of software modules stored on the device;
(ii) based on the determination of the determining step being that the device is set to the second state:
(a) comparing a current representation of the software modules stored on the device to a previously generated baseline representation of the software modules stored on the device; and
(b) outputting an alert if a discrepancy is determined in the comparing step.

23. The method of claim 6, wherein the activity log includes notations of the events in chronological order of their occurrences, the results being stored (a) following all those of the notations that are of those of the events that had occurred prior to the results having been obtained and (b) before all those of the notations that are of those of the events that occurred subsequent to the results having been obtained.

* * * * *